United States Patent
Nojima

(10) Patent No.: US 9,384,784 B2
(45) Date of Patent: Jul. 5, 2016

(54) DATA SYNCHRONOUS REPRODUCTION APPARATUS, DATA SYNCHRONOUS REPRODUCTION METHOD, AND DATA SYNCHRONIZATION CONTROL PROGRAM

(75) Inventor: Akira Nojima, Chuo-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 108 days.

(21) Appl. No.: 14/380,170

(22) PCT Filed: Mar. 12, 2012

(86) PCT No.: PCT/JP2012/056235
§ 371 (c)(1),
(2), (4) Date: Aug. 21, 2014

(87) PCT Pub. No.: WO2013/136406
PCT Pub. Date: Sep. 19, 2013

(65) Prior Publication Data
US 2015/0023647 A1    Jan. 22, 2015

(51) Int. Cl.
*H04N 5/932* (2006.01)
*G11B 27/30* (2006.01)
*H04N 7/18* (2006.01)

(52) U.S. Cl.
CPC .............. *G11B 27/3081* (2013.01); *H04N 7/18* (2013.01); *H04N 7/185* (2013.01)

(58) Field of Classification Search
CPC ....... H04N 7/185; H04N 7/18; G11B 27/3081
USPC ......................................... 386/201
See application file for complete search history.

(56) References Cited

U.S. PATENT DOCUMENTS 5,625,572 A    4/1997    Yonekura et al.
6,335,722 B1   1/2002    Tani et al.
(Continued)

FOREIGN PATENT DOCUMENTS

CN    1111536 A    11/1995
CN    1353830 A    6/2002
(Continued)

OTHER PUBLICATIONS

Examination Opinion Notice issued Sep. 11, 2015 in Korean Patent Application No. 10-2014-7025122 (with English language translation).

(Continued)

*Primary Examiner* — William Tran
(74) *Attorney, Agent, or Firm* — Oblon, McClelland, Maier & Neustadt, L.L.P

(57) ABSTRACT

A data synchronous reproduction apparatus capable of synchronously reproducing image frames and numerical data at high speed, including: a data storage section configured to store image data including multiple image frames of monitored objects captured by cameras, and process data including multiple numerical data acquired from the monitored objects in time series; a program storage section configured to store a data synchronous control program configured to reproduce the image data and synchronously reproduce the image data and the process data on the basis of frame numbers and a frame period of the image frames and a sampling interval or record numbers of the numerical data; and a CPU configured to execute the data synchronous control program.

8 Claims, 12 Drawing Sheets

(56) References Cited

U.S. PATENT DOCUMENTS

| | | | |
|---|---|---|---|
| 2002/0075244 A1* | 6/2002 | Tani | G05B 23/0216 345/173 |
| 2004/0227739 A1 | 11/2004 | Tani et al. | |
| 2005/0283805 A1* | 12/2005 | Hirose | G06F 17/30864 725/53 |
| 2007/0052818 A1 | 3/2007 | Makino et al. | |

FOREIGN PATENT DOCUMENTS

| | | | |
|---|---|---|---|
| CN | 101854505 A | | 10/2010 |
| CN | 101868767 A | | 10/2010 |
| JP | 5 34181 | | 2/1993 |
| JP | 5 79951 | | 3/1993 |
| JP | 6 289927 | | 10/1994 |
| JP | 2003179853 A | * | 6/2003 |
| JP | 2006 180212 | | 7/2006 |
| JP | 2012 27834 | | 2/2012 |
| KR | 10-2000-0028993 A | | 5/2000 |
| KR | 10-2002-0002229 A | | 1/2002 |
| TW | 200828991 A | | 7/2008 |
| TW | 201201590 A1 | | 1/2012 |
| WO | WO 03/023655 A2 | | 3/2003 |
| WO | 2008 143315 | | 11/2008 |

OTHER PUBLICATIONS

International Search Report Issued Apr. 10, 2012 in PCT/JP12/056235 Filed Mar. 12, 2012.
Combined Taiwanese Office Action and Search Report issued Jun. 17, 2015 in Patent Application No. 101114650 (with English language translation).
Office Action issued Feb. 16, 2016 in Chinese Patent Application No. 201280071331.3 (with English Translation).

* cited by examiner

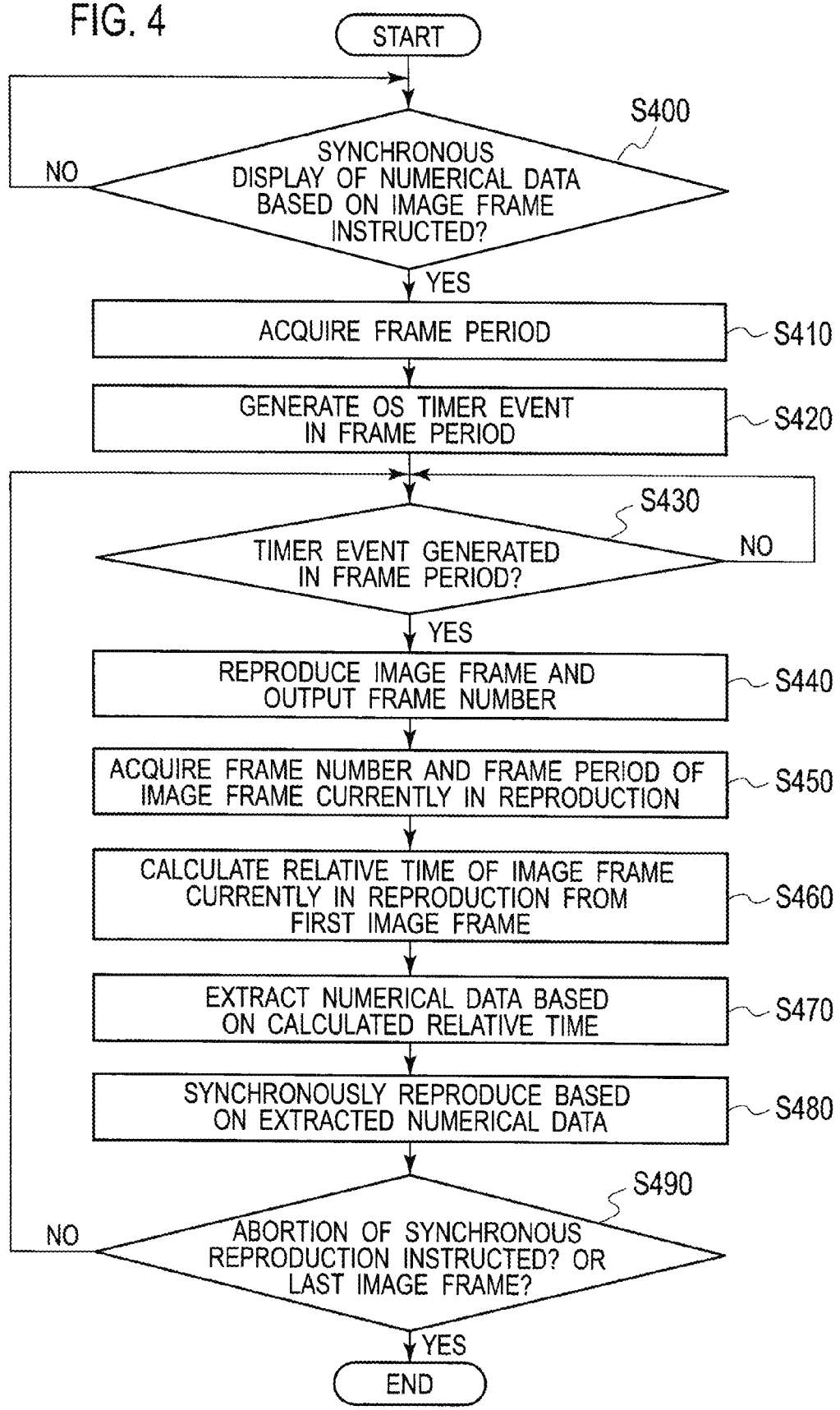

DATA SYNCHRONOUS REPRODUCTION APPARATUS, DATA SYNCHRONOUS REPRODUCTION METHOD, AND DATA SYNCHRONIZATION CONTROL PROGRAM

TECHNICAL FIELD

The present invention relates to a data synchronous reproduction apparatus, a data synchronous reproduction method and a data synchronization control program which are configured to synchronously display: image data including multiple image frames obtained by capturing monitored objects with cameras; and process data including multiple numerical data acquired from the monitored objects in time series.

BACKGROUND ART

As the data synchronous reproduction apparatus, a conventional technique has been proposed, for example, which enables meticulous plant monitoring in such a way that: when an anomaly occurs in a plant, numerical data and image frames of the plant on the occasion of the anomaly are displayed on a plant monitor, and are also stored in separated files in a storage device; and when historical information screens are developed for examining the anomaly, the numerical data and the image frames are displayed simultaneously (see PTL 1, for example).

CITATION LIST

Patent Literature

[PTL 1] Japanese Laid-open Patent Publication No. Hei 5-34181

SUMMARY OF INVENTION

Technical Problem

The data synchronous reproduction apparatus of PTL1 is, however, designed to display and store the numerical data and the image frames of the plant only when an anomaly occurs in the plant. For this reason, the data synchronous reproduction apparatus of PTL1 has a problem that numerical data and image frames in normal operation other than the occasion of the anomaly cannot be checked later.

In particular, the aforementioned data synchronous reproduction apparatus of PTL1 is designed to synchronously reproduce the numerical data and the image frames on the basis of records of the numerical data and date-time information added to the image frames when the numerical data and the image frames of the plant on the occasion of the anomaly are checked later. Accordingly, if the number of monitored objects is increased, or if the numerical data and image frames in normal operation are also stored, the number of files and a storage capacity for the files increase. For this reason, the data synchronous reproduction apparatus of PTL1 needs a very large-size storage device in order to store data covering a long period of time, and to synchronously reproduce the image frames and the numerical data later.

In addition, the data synchronous reproduction apparatus of PTL1 is designed to perform the synchronous reproduction by adding the date-time information to the numerical data and the image frames, and accordingly cannot use an image frame compressing and decoding technique such as MPEG-4 to store images, or cannot use generalized image data reproduction programs such as QuickTime (registered trademark) Player to reproduce images. For this reason, the data synchronous reproduction apparatus of PTL1 has a problem of an increase in development costs.

Moreover, the data synchronous reproduction apparatus of PTL1 has a difficulty in high-speed synchronous reproduction and cueing because it is designed to synchronously reproduce the image frames and the numerical data while collating the records of the numerical data and the date-time information added to the image frames.

The present invention has been made with the foregoing problems taken into consideration. An object of the present invention is to provide a data synchronous reproduction apparatus, a data synchronous reproduction method and a data synchronization control program which are capable of synchronously displaying image frames included in image data and data included in process data at high speed.

Solution to Problem

To attain the object, a first aspect of a data synchronous reproduction apparatus according to the present invention includes: an image data storage section configured to store a plurality of image frames on which a monitored object is captured by a camera, together with a frame period of the image frames, as image data with frame numbers assigned to the image frames in time series; a process data storage section configured to store data acquired from the monitored object and including a temporal change, and an elapsed time from a reference time point, collectively as process data; an image data reproducer configured to output and reproduce the image data, stored in the image data storage section, on a monitor, and to output the frame number of the image frame to be reproduced; and a data synchronous reproduction controller configured to calculate a relative time, from the first frame, of the image frame corresponding to the frame number outputted from the image data reproducer and to reproduce the data on the monitor on the basis of the calculated relative time from the first frame.

In a second aspect of the data synchronous reproduction apparatus of the present invention, when a certain time point is specified for the process data displayed on the monitor, the data synchronous reproduction controller calculates a relative time from the reference time point to the specified time point, calculates the frame number on the basis of the calculated relative time and the frame period of the image frame, outputs the calculated frame number to the image data reproducer, and causes the image data reproducer to reproduce the image data having the calculated frame number.

A third aspect of the data synchronous reproduction apparatus of the present invention further includes: a synchronous image frame selector configured to, when a time period of data to be stored as a different file in the process data displayed on the monitor is specified by an external input, calculate the frame number of the image frame corresponding to the specified time period on the basis of relative times of a head and an end of the specified time period from the reference time point, and the frame period of the image frame, and select the image frame corresponding to the calculated frame number; and a synchronous save controller configured to store the data corresponding to the time period specified by the external input, and the image frame selected by the synchronous image frame selector, collectively as the same file.

A fourth aspect of the data synchronous reproduction apparatus of the present invention further includes a screen layout setter configured to set an image data reproduction area in which the image data is displayed by the image data reproducer, and a process data reproduction area in which the process data is displayed by the data synchronous reproduction controller, on the monitor on the basis of the external input, and to set the number of records and the size of image data to be reproduced in the image data reproduction area within a predetermined condition.

Meanwhile a first aspect of a data synchronous reproduction method of the present invention includes: an image data storing step of storing a plurality of image frames on which a monitored object is captured by a camera, together with a frame period of the image frames, in an image data storage section as image data with frame numbers assigned to the respective image frames in time series; a process data storing step of storing data acquired from the monitored object and including a temporal change, and an elapsed time from a reference time point, in a process data storage section collectively as process data; an image data reproducing step of outputting and reproducing the image data, stored in the image data storage section, on a monitor, and outputting the frame number of the image frame to be reproduced; and a data synchronous reproduction controlling step of calculating a relative time, from the first frame, of the image frame corresponding to the frame number outputted in the image data reproducing step, and reproducing the data on the monitor on the basis of the calculated relative time from the first frame.

In a second aspect of the data synchronous reproduction method of the present invention according to claim 5, the data synchronous reproduction controlling step includes: when a certain time point is specified for the process data displayed on the monitor, calculating a relative time from the reference time point to the specified time point; calculating the frame number on the basis of the calculated relative time and the frame period of the image frame; outputting the calculated frame number; and causing the image data having the calculated frame number to be reproduced in the image data reproducing step.

A third aspect of the data synchronous reproduction method of the present invention further includes: a synchronous image frame selecting step of, when a time period of data to be stored as a different file in the process data displayed on the monitor is specified by an external input, calculating the frame number of the image frame corresponding to the specified time period on the basis of relative times of a head and an end of the specified time period from the reference time point, and the frame period of the image frame, and selecting the image frame corresponding to the calculated frame number; and a synchronous save controlling step of storing the data corresponding to the time period specified by the external input, and the image frame selected in the synchronous image frame selector, collectively as the same file.

A fourth aspect of the data synchronous reproduction method of the present invention further includes a screen layout setting step of setting an image data reproduction area in which the image data is displayed in the image data reproducing step, and a process data reproduction area in which the process data is displayed in the data synchronous reproduction controlling step on the monitor on the basis of the external input, and setting the number of records and the size of image data to be reproduced in the image data reproduction area within a predetermined condition.

Meanwhile, a first aspect of a data synchronous control program of the present invention causes a computer to execute: an image data storing step of storing a plurality of image frames on which a monitored object is captured by a camera, together with a frame period of the image frames, in an image data storage section as image data with frame numbers assigned to the respective image frames in time series; a process data storing step of storing data acquired from the monitored object and including a temporal change, and an elapsed time from a reference time point, in a process data storage section collectively as process data; an image data reproducing step of outputting and reproducing the image data, stored in the image data storage section, on a monitor, and outputting the frame number of the image frame to be reproduced; and a data synchronous reproduction controlling step of calculating a relative time, from the first frame, of the image frame corresponding to the frame number outputted in the image data reproducing step, and reproducing the data on the monitor on the basis of the calculated relative time from the first frame.

In a second aspect of the data synchronous control program of the present invention, the data synchronous reproduction controlling step includes: when a certain time point is specified for the process data displayed on the monitor, calculating a relative time from the reference time point to the specified time point; calculating the frame number on the basis of the calculated relative time and the frame period of the image frame; outputting the calculated frame number; and causing the image data having the calculated frame number to be reproduced in the image data reproducing step.

A third aspect of the data synchronous control program of the present invention further causes the computer to execute: a synchronous image frame selecting step of, when a time period of data to be stored as a different file in the process data displayed on the monitor is specified by an external output, calculating the frame number of the image frame corresponding to the specified time period on the basis of relative times of a head and an end of the specified time period from the reference time point, and the frame period of the image frame, and selecting the image frame corresponding to the calculated frame number; and a synchronous save controlling step of storing the data corresponding to the time period specified by the external output, and the image frame selected in the synchronous image frame selecting step, collectively as the same file.

A fourth aspect of the data synchronous control program of the present invention further causes the computer to execute a screen layout setting step of setting an image data reproduction area in which the image data is displayed in the image data reproducing step, and a process data reproduction area in which the process data is displayed in the data synchronous reproduction controlling step on the monitor on the basis of the external input, and setting the number of records and the size of image data to be reproduced in the image data reproduction area within a predetermined condition.

Advantageous Effects of Invention

In the data synchronous reproduction apparatus, the data synchronous reproduction method and the data synchronization control program of the present invention, the image frames and the data are synchronously reproduced on the basis of the frame numbers of the respective image frames included in the image data, and a period of time elapsed since the reference time point of the process data, but not on the basis of time information. For this reason, no time information need be added to the data or the image frames.

This makes it possible to reduce the number of files and the storage capacity for the files, and to perform the storage and the synchronous reproduction covering a longer period of time than a period available with the related art by use of the storage device with the same storage capacity as that of the related art.

Furthermore, since the data acquired from the monitored objects and representing temporal changes are stored, the data volume can be significantly reduced if there is continuously no temporal change for a long period of time.

Moreover, since the image frame compressing and decoding technique such as MPEG-4 can be used to store the images, a generalized image data reproduction program, such as QuickTime (registered trademark) Player, can be used to reproduce the images. Thereby, development costs can be reduced.

What is more, the data and the image frames can be synchronously reproduced and cued at high speed without using time information.

BRIEF DESCRIPTION OF DRAWINGS

FIG. 4 is a flowchart showing procedures for a data synchronous reproduction apparatus of Embodiment 1 to perform a data synchronous display process.

DESCRIPTION OF EMBODIMENTS

Embodiment 1

Figure 1:
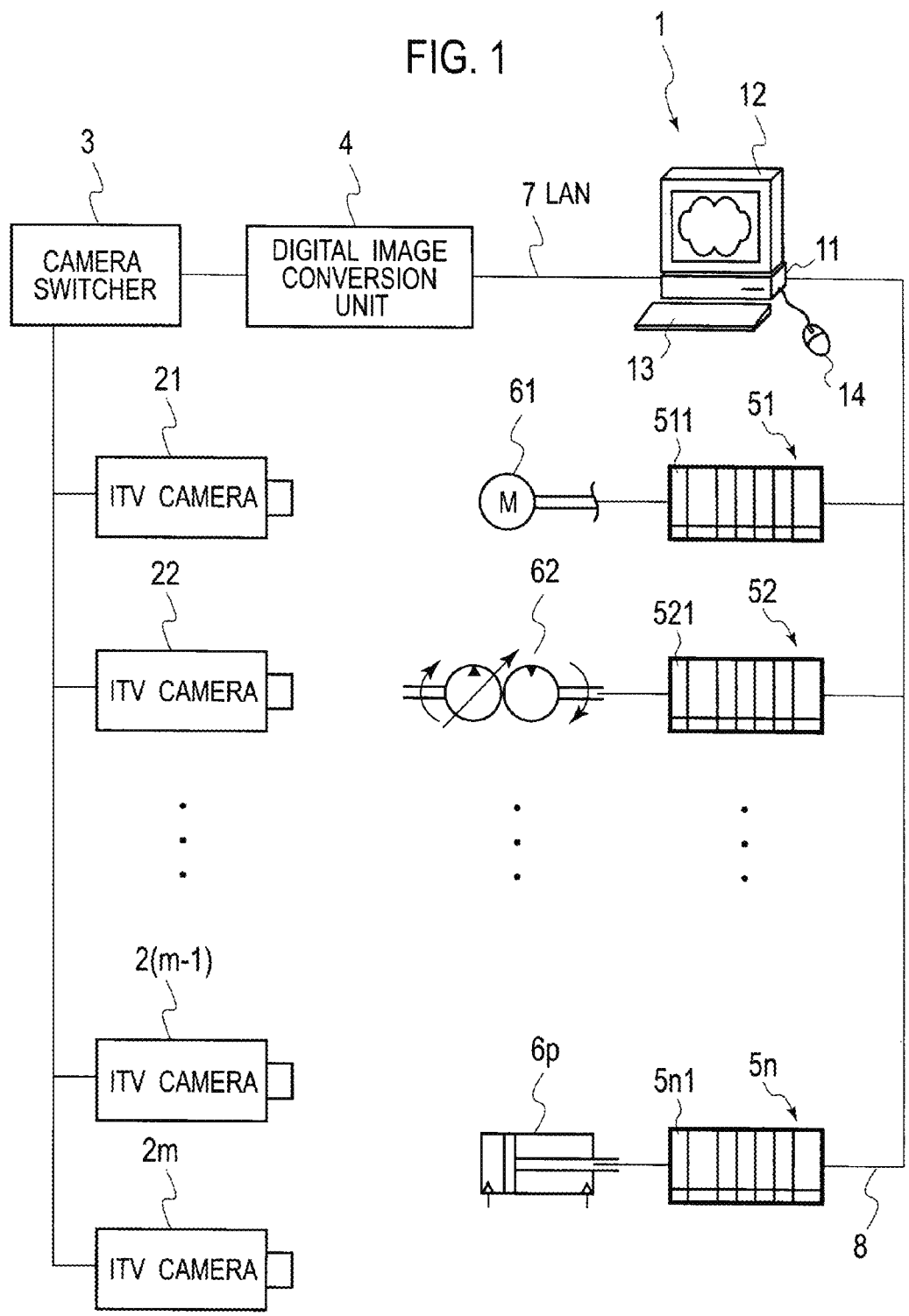
FIG. 1 is a diagram showing an example of a configuration of an online data management system which includes a data synchronous reproduction apparatus of the present invention.

Descriptions will be hereinbelow provided for a data synchronous reproduction apparatus, a data synchronous reproduction method and a data synchronization control program of Embodiment 1.
<Explanation of Configuration>
FIG. 1 is a diagram showing an example of a configuration of an online data management system including the data synchronous reproduction apparatus of the present invention.

The online data management system is configured, for example, to manage image data obtained by capturing monitored objects and process data acquired from the monitored objects while synchronously displaying the image data and the process data on a monitor in plant systems such as: a hot rolling plant system in which a heated iron, stainless steel or aluminum slab (billet) is rolled by a rolling mill into a hot rolled coil with a thickness of several millimeters to ten and several millimeters; and a process line plant system in which a coil produced by a hot rolling plant or a cold rolling plant is subjected to acid pickling, annealing, plating, coating, cutting or the like in order to form the coil into a finished product.

In FIG. 1, the online data management system is formed by connecting a data synchronous reproduction apparatus 1 of the present invention, multiple ITV (Industrial Television) cameras 21 to 2m (m: a natural number), a camera switcher 3, a digital image conversion unit 4, and controllers 51 to 5n (n: a natural number) such as programmable logic controllers (PLCs). The online data management system is a system configured to monitor operating conditions, control conditions, and the like of monitored objects 61 to 6p (p: a natural number) including a rolling mill, a pressing machine, as well as motors and pistons configured to drive these machines, and the like by use of image data obtained by the multiple ITV cameras 21 to 2m and process data acquired by the controllers 51 to 5n.

In this respect, for example, the data synchronous reproduction apparatus 1 and the digital image conversion unit 4 are connected together via a LAN 7 such as the Ethernet (registered trademark), while the data synchronous reproduction apparatus 1 and the controllers 51 to 5n are connected together via a control network 8 which is different from the LAN 7. It should be noted that if the controllers 51 to 5n can be connected to the LAN 7, the control network 8 can be replaced with the LAN 7.

In addition, the data synchronous reproduction apparatus 1 of the present invention is formed from a computer apparatus with a monitor (display) 12, a keyboard 13, a mouse 14 or the like connected to an apparatus main body 11. In addition, the data synchronous reproduction apparatus 1 is configured to: receive image data from the multiple ITV cameras 21 to 2m which are converted from analog video signals to digital video signals by the digital image conversion unit 4, and process data including multiple numerical data acquired from the controllers 51 to 5n; and to carryout processes and the like for the normal and synchronous displaying of those data on the monitor 12. Descriptions will be later provided for the configuration and operations of the data synchronous reproduction apparatus 1 of the present invention, as well as the configurations and the like of the image data and the process data of the present invention.

The ITV cameras 21 to 2m are configured to capture the multiple monitored objects 61 to 6p, and to output the analog video signals in PAL format, NTSC format, or the like. The ITV cameras 21 to 2m may be stationary cameras, or cameras that can be remote-controlled for panning, tilting, zooming and the like by sending control signals to the cameras. Furthermore, the ITV cameras 21 to 2m may or may not be provided with sound collecting microphones. The ITV cameras 21 to 2m may be provided to the monitored objects 61 to 6p on a one-to-one basis, or on a multiple-to-one basis.

The camera switcher 3 is configured to switch and output a predetermined number of video signals (for example, four video signals in Embodiment 1) to be displayed on the monitor 12 from the video signals outputted from the multiple ITV cameras 21 to 2m. It should be noted that the camera switcher 3 may naturally be omitted if there is no restriction on the number of video signals to be displayed on the monitor 12, if the number of ITV cameras 21 to 2m is less than the predetermined number, or if this switching function is assigned to the digital image conversion unit 4 or the data synchronous reproduction apparatus 1.

The digital image conversion unit 4 is configured to compress and encode the analog video signals in NTSC or PAL format outputted from the multiple ITV cameras 21 to 2m into digital image data in MPEG-4 format or the like, and to output the resultant data to the data synchronous reproduction apparatus 1. It should be noted that the digital image conversion unit 4 may be omitted if each of the multiple ITV cameras 21 to 2m can perform A/D conversion of the video signals captured by the camera and output the digital-format image data.

The controllers 51 to 5n are configured to control actions of the monitored objects 61 to 6p such as motors, heaters and hydraulic equipment on the basis of programs, respectively. The controllers 51 to 5n are configured to acquire the process data from the monitored objects 61 to 6p via their respective I/O (input/output) units 511 to 5n1, where the process data include numerical data detected in time series at predetermined sampling intervals to be described later from the monitored objects 61 to 6p.

Figure 2:
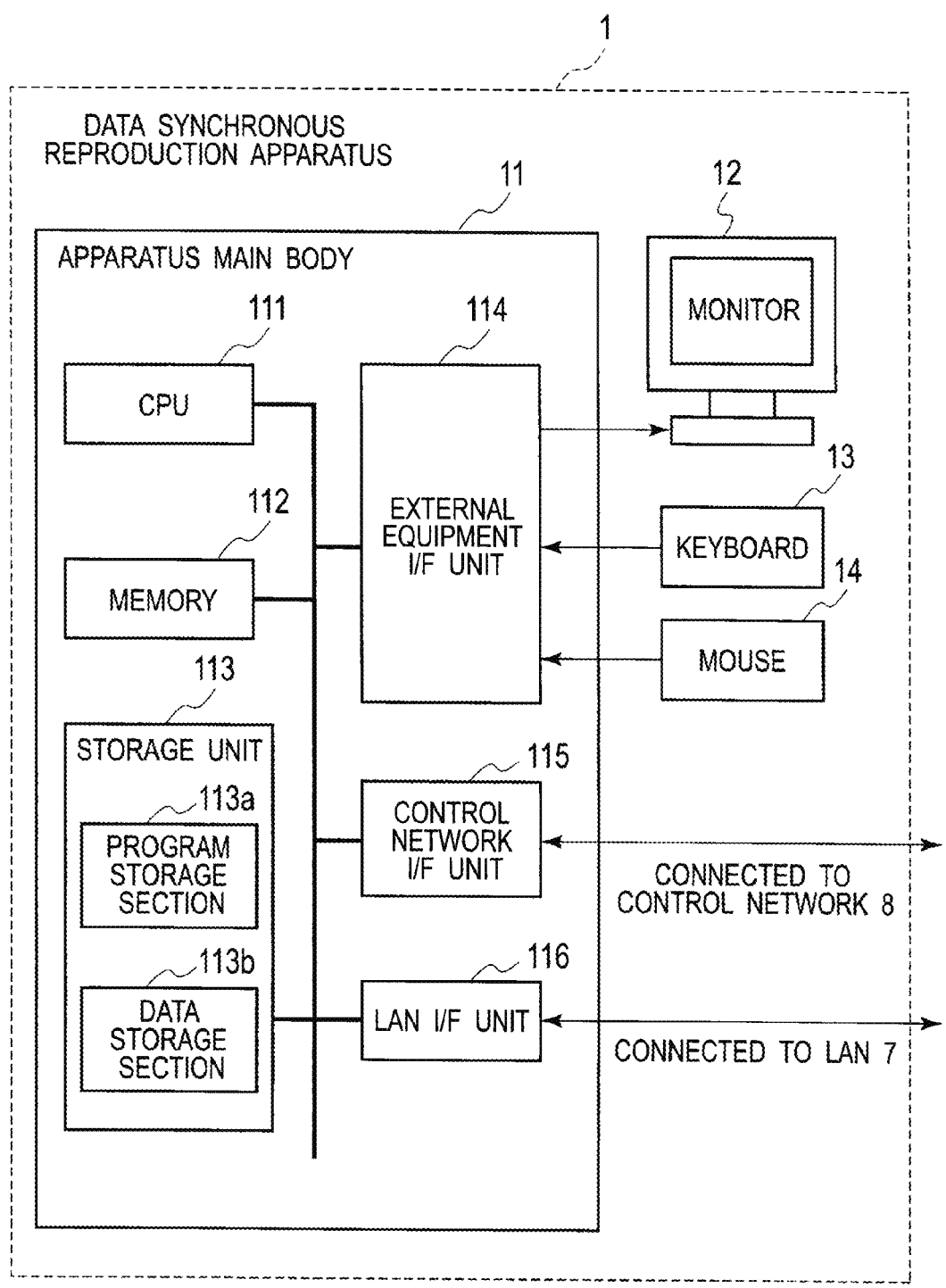
FIG. 2 is a block diagram showing an example of a configuration of the data synchronous reproduction apparatus of the present invention.

FIG. 2 is a block diagram showing an example of the configuration of the data synchronous reproduction apparatus 1 of the present invention.

As described above, the data synchronous reproduction apparatus 1 is formed from the computer apparatus with the monitor (display) 12, the keyboard 13, the mouse 14 or the like connected to the apparatus main body 11.

As shown in FIG. 2, the apparatus main body 11 is formed by connecting a CPU 111, a memory 112, a storage unit 113 such as a HDD or a large-capacity memory, an external equipment interface (hereinafter abbreviated to I/F) unit 114, a control network I/F unit 115, a LAN I/F unit 116 and the like via an internal bus 117.

The CPU 111 functions as an image data reproducer of the present invention by executing an image data reproduction program out of various application programs stored in a program storage section 113a of the storage unit 113, and functions as a data synchronous reproduction controller, a synchronous image frame selector, a synchronous save controller and a screen layout setter of the present invention by executing a data synchronization control program.

The memory 112 is used as an operation area and the like for doing things such as temporarily storing and expanding data when the CPU 111 executes various application programs.

The storage unit 113 includes the program storage section 113a and a data storage section 113b.

The program storage section 113a stores an OS (operating system), the image data reproduction program for making the CPU 111 function as the image data reproducer of the present invention, and the application programs such as the data synchronization control program for making the CPU ill function as the data synchronous reproduction controller, the synchronous image frame selector, the synchronous save controller and the screen layout setter of the present invention. It should be noted that the image data reproduction program used for Embodiment 1 may be an image data reproduction program programmed exclusively for the apparatus, or a generalized image data reproduction program such as Quick-Time (registered trademark) Player.

As an image data storage section of the present invention, the data storage section 113b stores the image data including multiple image frames which are obtained by capturing the multiple monitored objects 61 to 6p with the multiple ITV cameras 21 to 2m and are subjected to the A/D conversion. In addition, as a process data storage section of the present invention, the data storage section 113b stores the process data including the multiple numerical data acquired in time series from the multiple monitored objects 61 to 6p by the controllers 51 to 5n.

In Embodiment 1, the program storage section 113a and the data storage section 113b are provided in the single storage unit 113. It is a matter of course, however, that the program storage section 113a and the data storage section 113b may be formed as separate storage units.

The external equipment I/F unit 114 is an interface for connecting the external equipment including the monitor 12, the keyboard 13 and the mouse 14 to the apparatus main body 11.

The control network I/F unit 115 is an interface for connecting a control network 19 and the apparatus main body 11 together.

The LAN I/F unit 116 is an interface for connecting the LAN 7 and the apparatus main body 11.

Figure 3A:
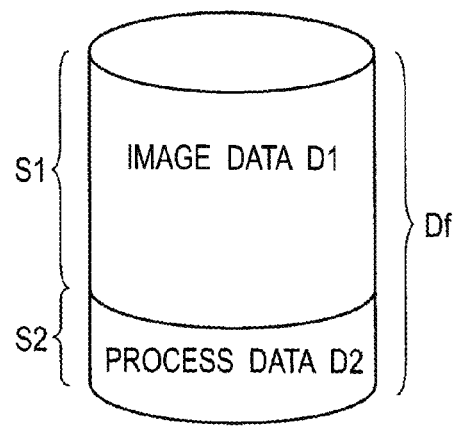
FIG. 3A is a diagram showing an example of a file format for image data and process data stored in a data storage device in the data synchronous reproduction apparatus.
Figure 3B:
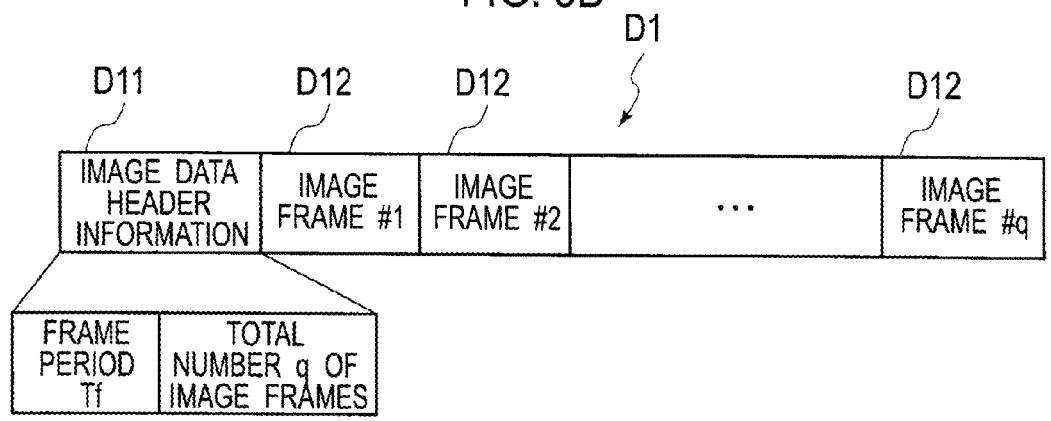
FIG. 3B is a diagram showing an example of a data structure of the image data.
Figure 3C:
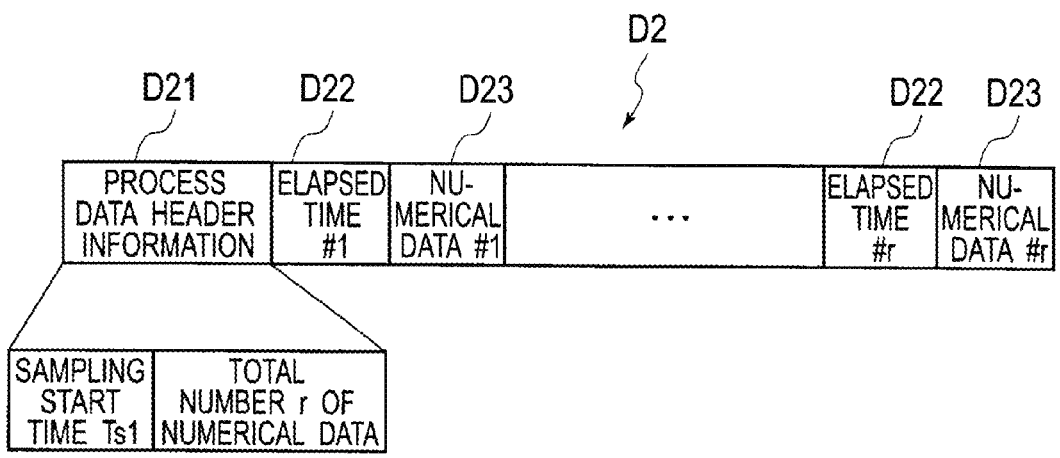
FIG. 3C is a diagram showing an example of a data structure of the process data.

FIGS. 3A to 3C are diagrams showing: a file format of the image data and the process data stored in the data storage section 113b of the data synchronous reproduction apparatus 1; an example of a data structure of the image data; and an example of a data structure of the process data.

In the data storage section 113b of the storage unit 113 in the data synchronous reproduction apparatus 1, as shown in FIG. 3A, the image data D1 including the multiple image frames which are obtained by capturing the multiple monitored objects 61 to 6p with the multiple ITV cameras 21 to 2m, and the process data D2 including the multiple numerical data acquired in time series from the monitored objects 61 to 6p by the controllers 51 to 5n are stored respectively in two sections S1, S2 in a single data file Df. In this respect, it is a matter of course that the image data D1 and the process data D2 may be stored in separate sections in separate files, respectively.

FIG. 3B is the diagram showing the data structure of the image data D1 stored in the data storage section 113b.

As shown in FIG. 3B, from each of the multiple ITV cameras 21 to 2m, the image data D1 is obtained as digital image data in MPEG-4 encoding format or the like into which the digital image conversion unit 4 converts the analog video signals outputted from the ITV camera. For each of the ITV cameras 21 to 2m, the image data D1 is formed from: image header information D11; and multiple image frames D12, which are obtained by capturing the monitored objects 61 to 6p with the ITV cameras 21 to 2m, and have frame numbers #1 to #q (q: a natural number). FIG. 3B shows only one set of image data D1 for the sake of explanatory convenience. Actually, however, image data D1 exists for each of the multiple ITV cameras 21 to 2m.

In the case of Embodiment 1, as shown in FIG. 3B, the image header information D11 includes at least a frame period Tf representing a time length of each of the image frames D12 included in the image data D1 and the total number q of image frames D12 included in the image data D1. It should be noted that, of course, the image header information D11 may include camera identification information for identifying the ITV cameras 21 to 2m outputting the image data D1, as well as data and time identification information for identifying the multiple image data D1 outputted from one of the ITV cameras 21 to 2m on different dates and/or at different time points. Furthermore, it goes without saying that the image header information D11 may include information such as link information for linking the image data D1 with the corresponding process data D2.

In this respect, in Embodiment 1, the frame period Tf of each image frame D12 is set at 1/30 second, for example. However, 1/30 second is a mere example. It is a matter of course that the frame period Tf of each image frame D12 may be set at 1/60 second, 1/50 second, or the like.

Each image frame D12 is data into which a video signal in analog format captured by one of the ITV cameras 21 to 2m is highly efficiently compressed and encoded by the digital image conversion unit 4 using a moving picture compression format such as MPEG-4 format. It is a matter of course that other compression encoding formats, such as H.264 encoding format and Motion-JPEG that does not apply inter-frame prediction may be used instead. What is essential is that the data applies a digital image data format to be transmitted via the LAN 7. It should be noted that for normal decoding reproduction, each of the multiple image frames D12 may be provided with time information such as the decoding time stamp (DTS) and the presentation time stamp (PTS). In Embodiment 1, however, none of the time information, such as the decoding time stamp (DTS) or the presentation time stamp (PTS), is used for the process for reproducing the image data in synchronism with the process data.

As described above, in Embodiment 1, the time information is not included in the image data D1, or is not used to reproduce the image data D1 in synchronism with the process data D2 even if the time information is included in the image data D1. For these reasons, in Embodiment 1, when the image data D1 and the process data D2 are synchronously reproduced, a sampling start time Ts1 stored in process data header information D21 in the process data D2 corresponding to the image data D1 is used as a start time (a reference time point) for the image data D1, or as reproduction start information for the image frame D12 having the frame number #1. In addition, frame reproduction start times for the image frames D12 having the frame numbers #2 to #p after the image frame D12 having the frame number #1 are calculated on the basis of the sampling start time Ts1 used as the reproduction start time for the image frame D12 having the frame number #1, the frame numbers # assigned to the image frames D12, and the like, as described later. For this reason, in Embodiment 1, the process of reproducing the image data D1 in synchronism with the process data D2 needs no time information on each image frame D12, or does not use (does not refer to) the time information and the like even if provided. Accordingly, since the reproduction is carried out on the basis of the frame numbers without using (referring to) the time information on each image frames D12, the reproduction and cueing can be carried out at high speed.

FIG. 3C is a diagram showing a data structure of the process data D2 stored in the data storage section 113b.

The process data D2 is binary data having numerical data D23, which are acquired by the controllers 51 to 5n from the multiple monitored objects 61 to 6p and represent temporal changes. As shown in FIG. 3C, the process data D2 includes: the process data header information D21; the multiple numerical data D23 which are acquired by the controllers 51 to 5n from the monitored objects 61 to 6p when the monitored objects 61 to 6p have temporal changes, and which have record numbers #1 to #r (r: a natural number); and elapsed times D22 which have passed since the sampling start time Ts1 (the reference point of time) corresponding to the numerical data D23, and which have elapsed time numbers #1 to #r (r: the natural number).

In the case of Embodiment 1, the process data header information D21 stores, at least, the sampling start time Ts1 representing the time when acquisition of the process data D2 is started, and the total number r of records of numerical data D23 acquired from the monitored objects 61 to 6p. It should be noted that the elapsed time D22 having an elapsed time number #1 is "0," or represents the sampling start time Ts1. The numerical data D23 acquired from the monitored objects 61 to 6p at the sampling start time Ts1 is stored in the record number #1.

The numerical data D23 is acquired from the monitored objects 61 to 6p only when there is a temporal change, but is not acquired when there is no temporal change. For this reason, if there is no temporal change in the numerical data D23 for a continuous long period, the data capacity for the process data D2 can be significantly reduced.

As described above, the multiple image frames D12 included in the image data D1 and the multiple numerical data D23 included in the process data D2 are not synchronized when recorded. For this reason, the data synchronous reproduction apparatus 1 of Embodiment 1 needs to perform a synchronization process in order to subject the image frames D12 included in the image data D1 and the numerical data D23 included in the process data D2 to a synchronous reproduction process without using the time information on the image data D1 such as the decoding time stamp (DTS) and the presentation time stamp (PTS), or the time information indicating the time of acquisition of the process data D2.

For this reason, the data synchronous reproduction apparatus 1 of Embodiment 1 performs the synchronous reproduction process using the frame numbers, the elapsed times, the image frames and the numerical data without using or referring to the time information.

<Explanation of Operation>

Next, referring to a flowchart, descriptions will be provided for a data synchronous display process to be performed by the data synchronous reproduction apparatus 1 of the Embodiment 1.

(Explanation of Operation of Synchronous Reproduction from Image Data D1 to Process Data D2)

First of all, referring to the flowchart, descriptions will be provided for how the data synchronous reproduction apparatus 1 of Embodiment 1 synchronously reproduces the process data on the basis of the image data.

FIG. 4 is a flowchart showing procedures of the data synchronous display process by the data synchronous reproduction apparatus 1 of Embodiment 1.

To begin with, once the user inputs an instruction to synchronously reproduce the image data D1 and the process data D2 into the apparatus main body 11 by clicking on (selecting) a synchronous reproduction button (not illustrated) through the manipulation of the keyboard 13, the mouse 14 or the like of the data synchronous reproduction apparatus 1 ("YES" in S400), the CPU 111 starts the synchronous reproduction process by activating the image data reproduction program and the data synchronization control program which are stored in the program storage section 113a.

To put it specifically, first of all, the CPU 111 of the apparatus main body 11 functions as the image data reproducer by executing the image data reproduction program, reads the image data header information D11 and the process data header information D21 respectively from the image data D1 and the process data D2 stored in the data storage section 113b, temporarily saves the image data header information D11 and the process data header information D21 in the memory 112, and acquires the frame period Tf included in the image data header information D11 (S410). In this respect, the CPU 111 acquires, for example, the value 1/30 second as the frame period Tf as described above.

Here, the CPU 111 may naturally be designed to acquire the frame period Tf through the process in S410 in advance before the process in S400. Meanwhile, if the frame period Tf included in the image data header information D11 has been already known, the CPU 111 need not acquire the frame period Tf included in the image data header information D11.

Subsequently, the CPU 111 functions as the image data reproducer of the present invention by executing the image data reproduction program, and generates timer event signals at intervals of 1/30 second, which is the frame period Tf of the image data D1, using an OS timer (not illustrated) (S420).

Thereafter, once the CPU 111 generates the timer event signals at the intervals of 1/30 second which is the frame period Tf ("YES" in S430), the CPU 111 functions as the image data reproducer of the present invention and reads the image frames D12 included in the image data D1 stored in the data storage section 113b. If the image frames D12 are encoded in MPEG-4 format or the like, the CPU 111 decodes the image frames D12 in MPEG-4 format, and reproduces the image frames D12 on the monitor 12, concurrently outputting the frame numbers of the reproduced image frames D12 (S440). In this respect, if the user specifies the image frame from which to start the reproduction by using its frame number or the like, the CPU 111 starts the reproduction with the specified image frame. It should be noted that: the image frame D12 may be specified not only by using the frame number or the like, but also with a cursor on the display screen displayed on the monitor 12 by manipulating the keyboard 13 or the mouse 14. When no image frame D12 is specified, the reproduction starts with the first image frame D12 in the image data D1, namely the image frame D12 with the frame number #1. At this stage, the image data D1 is reproduced asynchronously with the process data D2.

Simultaneously, the CPU 111 functions as the data synchronous reproduction controller of the present invention by executing the data synchronous control program of the present invention. First, the CPU 111 acquires the frame number and the frame period Tf of the image frame D12 currently in reproduction (S450). In this respect, if the frame period Tf included in the image data header information D11 is already known, the CPU 111 uses the already-known frame period Tf in the process in S450 like in the process in S410.

Subsequently, as the data synchronous reproduction controller of the present invention, the CPU 111 calculates a "relative time from the first image frame" by using Equation (1) given below on the basis of the frame number and the frame period Tf of the image frame D12 currently in reproduction (S460).

$$\text{Relative Time from First Image Frame} = \text{Frame Number} \times \text{Frame period } Tf \quad (1)$$

Next, as the data synchronous reproduction controller of the present invention, the CPU 111 compares the "relative time from the first image frame" obtained by Equation (1) given above with the elapsed times D22 in the process data D2 temporarily stored in the memory 112 or the like, and thereby extracts the numerical data D23 which is in synchronism with the image frame D12 currently on display (S470). Since the elapsed time D22 and the numerical data D23 are designed to be acquired from the monitored objects 61 to 6p only when there are the temporal changes, there does not always exist the elapsed time D22 which coincides with the "relative time from the first image frame." For this reason, the CPU 111 compares the "relative time from the first image frame" with the elapsed times D22 in the order of the elapsed time numbers #1 to #r, and thereby extracts the numerical data D23 which corresponds to the longest elapsed time D22 within a range not exceeding the "relative time from the first image frame."

Then, the CPU 111 performs the display on the basis of the extracted numerical data S23 (S480). Thus, the CPU 111 is capable of synchronously reproducing the numerical data D23, which is temporally in synchronism with the image frame D12 currently on display, on the basis of the frame number of the image frame D12 and the elapsed time D22 but without referring to the time information. In this respect, if the process data D2 is displayed with a graph format or the like, for example, the CPU 111 updates the display of the graph by: converting the numerical data D23 of the relevant record number into the graph format or the like; and updating values included in a range to be displayed in the graph. It should be noted that if the numerical data D23 is formed from multiple items #1 to #s, the multiple items #1 to #s are reflected in the graph.

Thereafter, until the user inputs an instruction to abort the synchronous reproduction or the reproduction of the last image frame D12 in the image data D1 currently on display is completed ("NO" in S490), the CPU 111 performs the synchronous reproduction process on the image frame D12 and the numerical data D23, whose respective frame number and record number are made to correspond to each other, by performing the processes from S440 through S480 described above each time the timer event signal is generated at the interval of 1/30 second which is the frame time Tf ("YES" in S430).

For this reason, the data synchronous reproduction apparatus 1 of the present invention is capable of synchronously reproducing the image frame D12 included in the image data D1 and the numerical data D23 included in the process date D2 by making the frame number in the image data D1 and the elapsed time D22 correspond to each other without referring to the time information.

Once the user inputs the instruction to abort the synchronous reproduction or the reproduction of the last image frame D12 in the image data D1 currently on display is completed ("YES" in S490), the CPU 111 terminates the synchronous reproduction.

(Concrete Example of Synchronous Reproduction from Image Data D1 to Process Data D2)

Next, a concrete example of the synchronous reproduction from the image data D1 to the process data D2 will be described on the basis of a drawing.

Figure 5:
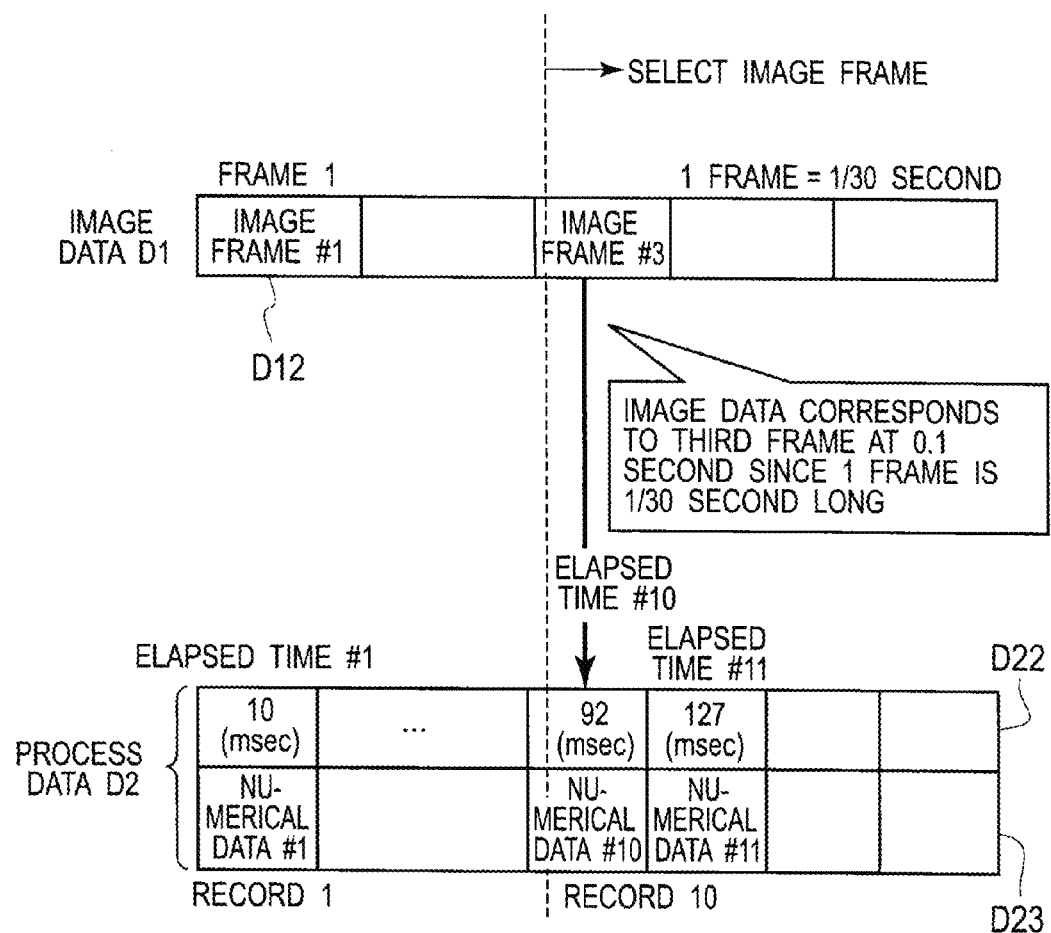
FIG. 5 is a diagram showing a concrete example of how a synchronous reproduction process from the image data to numerical data is performed.

FIG. 5 shows a concrete example of a process for the synchronous reproduction from the image data D1 to the process data D2. It should be noted that illustration of the image data header information D11 in the image data D1 and the process data header information D21 in the process data D2 is omitted in FIG. 5.

Let us assume, for example, that the data synchronous reproduction apparatus 1 of Embodiment 1 is reproducing the image frame with the frame number #3 which is the third frame from the first image frame in the image data D1, as shown in FIG. 5. In Embodiment 1, since the frame period Tf is set at 1/30 second, the CPU 111 calculates the relative time from the first image frame D12 with the frame number #1 as 3×1/30 second=100 (milliseconds) by use of Equation (1) given above.

Thereafter, the CPU 111 extracts a numerical data #10 corresponding to an elapsed time number #10 because the 100 (milliseconds) which is the relative time from the first image frame D12 with the frame number #1 is longer than 92 (milliseconds) corresponding to an elapse time number #10, and shorter than 127 (milliseconds) corresponding an elapsed time number #11.

Accordingly, the data synchronous reproduction apparatus 1 of Embodiment 1 is capable of synchronously reproducing the image frame D12 and the numerical data D23 by use of the frame number of the image frame D12, the elapsed time D22 and the like without using the time information on the image frame D12 or the numerical data D23, even if the image frame D12 included in the image data D1 and the numerical data D23 included in the process data D2 are not synchronized when the data are recorded.

As a consequence, the data synchronous reproduction apparatus 1 of Embodiment 1 is capable of performing the synchronous reproduction process on the image data D1 and the process data D2 at high speed, since the synchronous reproduction process no longer need to refer to the time information on each of the data, and accordingly no longer need to analyze and find the syntax (structure) of or the header information on the image data D1 or the process data D2.
(Explanation of Synchronous Reproduction from Process Data D2 to Image Data D1)

Next, referring to a flowchart, descriptions will be provided for a process for the synchronous reproduction from the process data D2 to the image data D1 in the data synchronous reproduction apparatus 1 of Embodiment 1.

Figure 6:
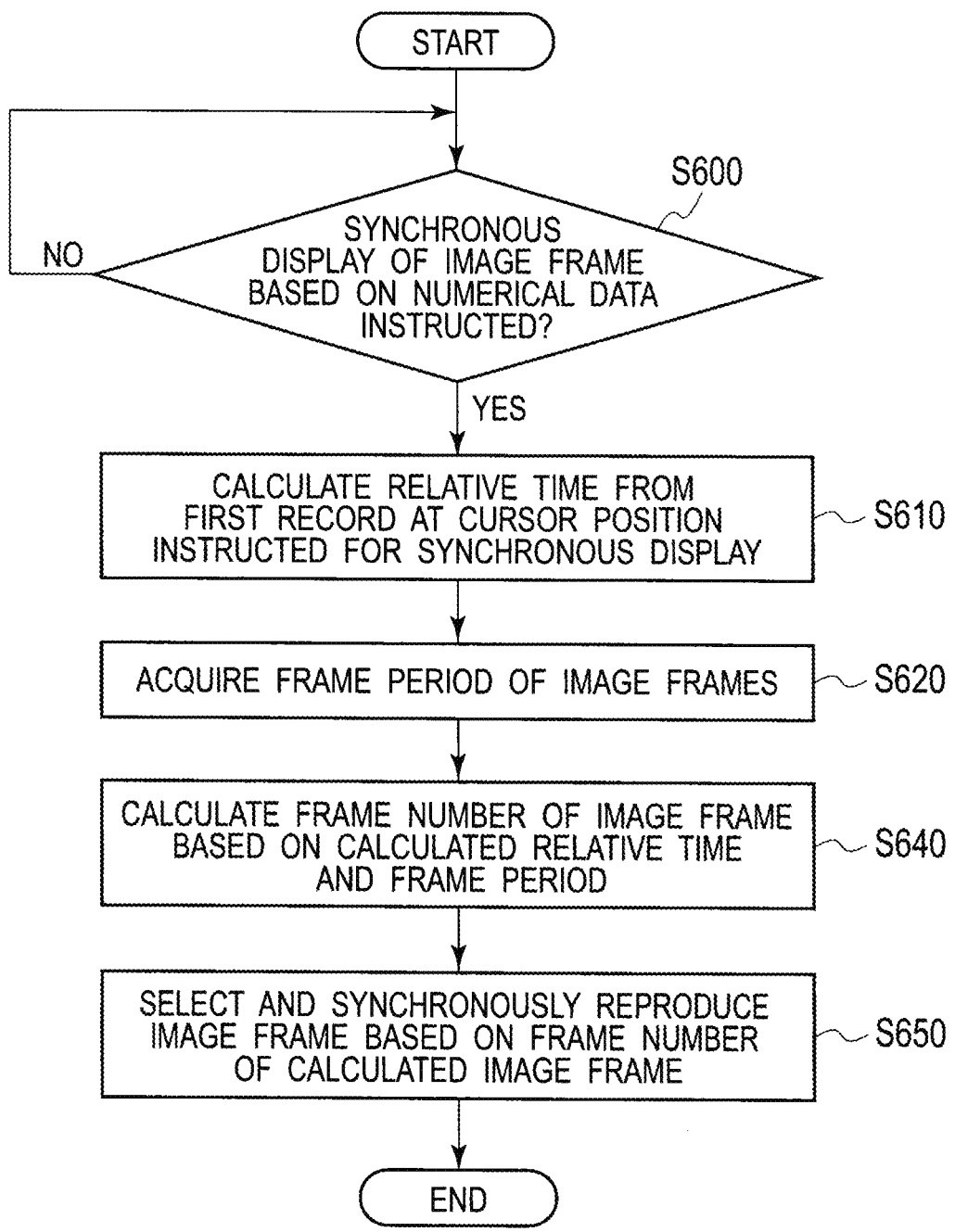
FIG. 6 is a flowchart showing procedures for the data synchronous reproduction apparatus of Embodiment 1 to perform the data synchronous display process.

FIG. 6 is a flowchart showing procedures of the data synchronous display process by the data synchronous reproduction apparatus 1 of Embodiment 1.

Once the user specifies a time point for a numerical data D23 in the process data D2 by moving a scroll bar, the cursor or the like, for example, in a display area for the process data D2 displayed on the monitor 12 by use of the mouse 14, the keyboard 13 or the like, and thereby inputs to the apparatus main body 11 an instruction to synchronously reproduce the numerical data D23 at the specified time point and the corresponding image frame D12 ("YES" in S600), the CPU 111 functions as the data synchronous reproduction controller by executing the data synchronous control program. First of all, the CPU 111 calculates a relative time from the first record at the position of the scroll bar or the cursor moved by use of the mouse 14, the keyboard 13 or the like (S610). To put it specifically, as the relative time, the CPU 111 calculates a time period from the sampling start time Ts1 (the reference time point) to the time point shown by the position of the scroll bar or the cursor.

Simultaneously, the CPU 111 functions as the data synchronous reproduction controller, and acquires the frame period Tf from the image data header information D11 in the image data D1 (S620). Here, it goes without saying that, if the sampling interval Ts2 and the frame period Tf are already known to the CPU 111 by means of the storage or the like, the CPU 111 may skip the process of acquiring the sampling interval Ts2 and the frame period Tf.

Then, the CPU 111 functions as the data synchronous reproduction controller, and calculates a "frame number of a to-be-synchronized image frame" which is in synchronism with the current numerical data by dividing the calculated "relative time from the first record" by the frame period Tf which is a time period per frame for the image frames D12 as shown in Equation (2) given below (S640).

$$\text{Frame Number of To-be-Synchronized Image Frame} = \text{Relative Time from First Record} \div \text{Frame period } Tf \qquad (2)$$

Thereafter, the CPU 111 functions as the image data reproducer, as well as reads and synchronously reproduces the image frame D12 having the corresponding frame number from the image data D1 stored in the data storage section 133b on the basis of the frame number calculated using Equation (2) given above (S640). To put it specifically, the CPU 111 synchronously reproduces the numerical data D23 corresponding to the "relative time from the first record" and the image frame D12 having the corresponding frame number. For example, the CPU 111 extracts the numerical data D23 corresponding to an elapsed time D22 which is the longest within the range not exceeding the "relative time from the first record" by comparing the "relative time from the first record" with the values representing the respective elapsed times D22 in the order of the elapsed time numbers #1 to #r, and synchronously reproduces the thus-extracted numerical data D23 and the image frame D12 having the "frame number of the to-be-synchronized image frame."

Thus, Embodiment 1 can synchronously process the numerical data D23 and the image frame D12 by using the elapsed time and the frame number of the image frame D12.
(Concrete Example of Synchronous Reproduction from Process Data D2 to Image Data D1)

Next, a concrete example of the synchronous reproduction from the process data D2 to the image data D1 will be described on the basis of a drawing.

Figure 7:
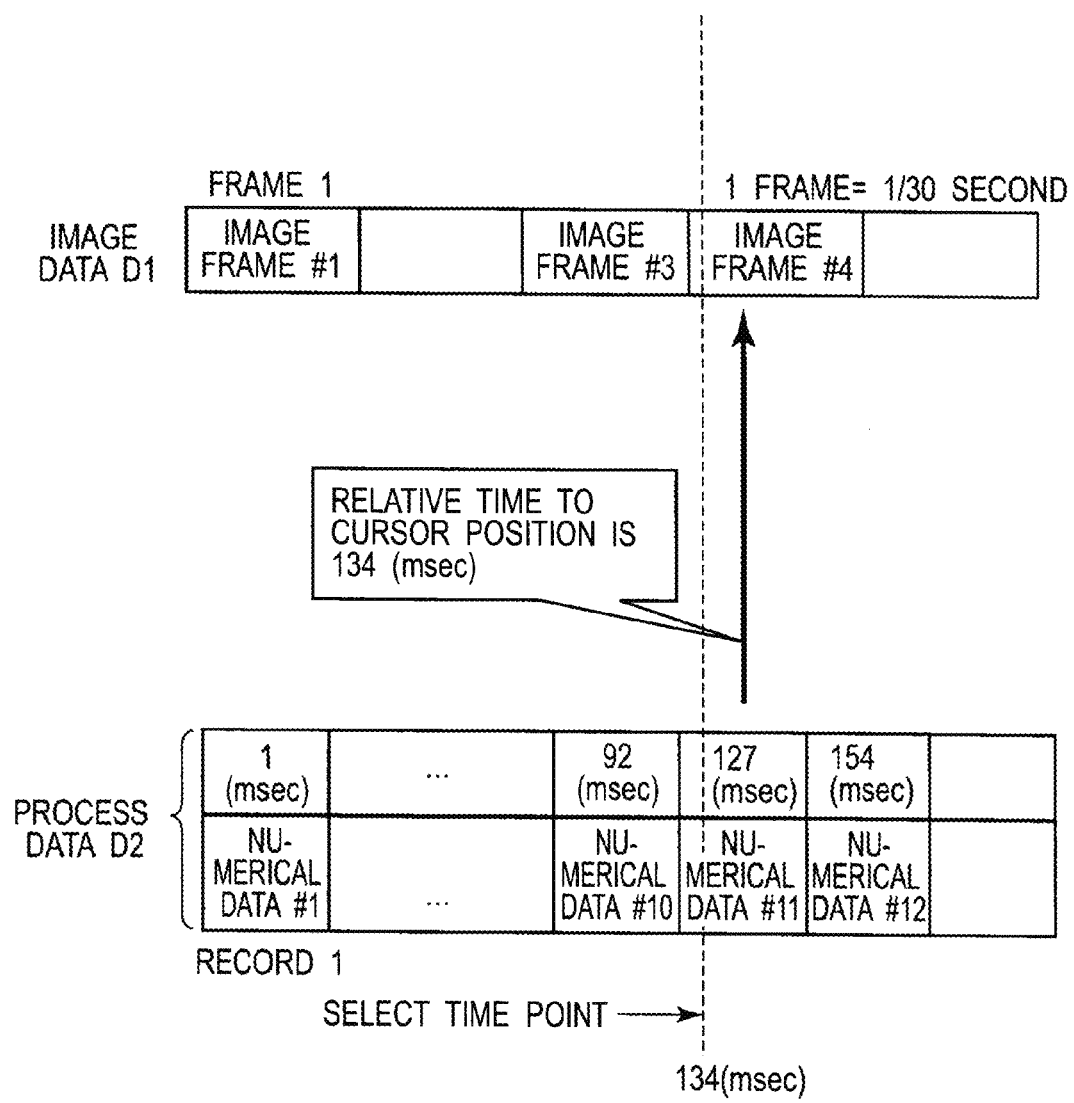
FIG. 7 is a diagram showing a concrete example of how a synchronous reproduction process from the numerical data to the image data is performed.

FIG. 7 shows a concrete example of a process for the synchronous reproduction from the process data D2 to the image data D1. It should be noted that like FIG. 5, illustration of the image data header information D11 in the image data D1 and the process data header information D21 in the process data D2 is omitted in FIG. 7.

In the data synchronous reproduction apparatus 1 of Embodiment 1, for example as shown in FIG. 7, once the user specifies a time point in the process data D2 by moving the scroll bar, the cursor or the like in the display area displayed on the monitor 12 for the process data D2 by use of the mouse 14, the keyboard 13 or the like, the CPU 111 calculates the relative time from the first record, for example, as 134 (milliseconds) on the basis of the specified position.

Thus, the frame number of the image frame D12 which should be synchronized with the numerical data D23 whose relative time from the first record is the 134 milliseconds is calculated as 134 milliseconds÷(1/30 second)=4.02≈4 according to Equation (2) given above as the frame period Tf is 1/30 second. Thereby, the image frame D12 having the frame number #4 which is the fourth one from the first image frame D12 is reproduced in synchronism with the numerical data D23 whose relative time from the first record corresponds to the 134 milliseconds.

Accordingly, the data synchronous reproduction apparatus 1 of Embodiment 1 is capable of synchronously reproducing the corresponding image frame D12 in the data image D1 by only specifying the position of the cursor using the frame number of the image frame D12, the relative time from the first record, and the like.

It should be noted that although the data synchronous reproduction apparatus 1 of Embodiment 1 stores the process data D2 including the multiple numerical data acquired in time series by the controllers 51 to 5n from the multiple monitored objects 61 to 6p in the data storage section 133b in the storage unit 113, data to be included in the process data D2 are not limited to the numerical data and may be bit data or text data.
(Concrete Examples of Display Screens)

Next, descriptions will be provided for concrete examples of display screens to be displayed on the monitor 12 of the data synchronous reproduction apparatus 1 of Embodiment 1.

FIGS. 8 to 12 are diagrams showing concrete examples of display screens 121 to 125 to be displayed on the monitor 12 of the data synchronous reproduction apparatus 1 of Embodiment 1, respectively. It should be noted that the display screens 121 to 125 shown in FIGS. 8 to 12 are examples of display screens set and changed by the CPU 111 of the data synchronous reproduction apparatus 1 of Embodiment 1, which functions as the screen layout setter by executing the data synchronous control program stored in the program storage section 113*a*. In other words, the display screens 121 to 125 shown in FIGS. 8 to 12 are examples of display screens which are displayed by the CPU 111, which functions as the screen layout setter configured to set an image data reproduction area on the monitor 12 for displaying image data based on the user's instruction, to set a process data reproduction area on the monitor 12 for displaying the process data, and to set the number and sizes of the image data to be reproduced in the image data reproduction area within predetermined conditions.

On the display screen 121 shown in FIG. 8, an image data display area 121*a* is provided on an upper side above the center of the display screen 121 while a process data display area 121*b* is provided on a lower side below the center of the display screen 121 by means of the function as the screen layout setter. Furthermore, the display screen 121 is provided with four image data display windows 121*a*1 to 121*a*4 in the image data display area 121*a*. Image data D1 representing moving images, for example, from four ITV cameras with the camera numbers #1 to #4 (the cameras 1 to 4) among the multiple ITV cameras 21 to 2*m* switched by the camera switcher 3 either automatically or on the basis of the user's instruction is displayed in the four image data display windows 121*a*1 to 121*a*4.

Moreover, in the display screen 121, process data D2 on the monitored objects captured by the four ITV cameras with the camera numbers #1 to #4 (the camera 1 to 4) which are switched by the camera switcher 3 is reproduced in the process data display area 121*b*. In this respect, in the process data display area 121*b*, a horizontal axis extending in a horizontal direction in the drawing represents a time axis, while a vertical axis extending in a vertical direction in the drawing indicates values (levels) of the numerical data D23 included in the process data D2.

In addition, the CPU 111 functioning as the data synchronous reproduction controller reproduces the image data D1 in the four image data display windows 121*a*1 to 121*a*4, and the process data D2 in the process data display area 121*b* by synchronizing the image frames D12 and the numerical data D23 as described above.

It should be noted that a process data time change bar 121*b*2 and the like which are movable in the horizontal direction in the drawing are displayed in the process data display area 121*b* of the display screen 121 for the purpose of changing a time corresponding to a to-be-reproduced portion of the process data D2. The user can make the time axis for the process data D2 larger or smaller, and displays the process data D2 in an enlarged manner, through the process data time change bar 121*b*2 by manipulating a cursor (not illustrated) on the display screen 121 by use of the keyboard 13 or the mouse 14

Figure 8:
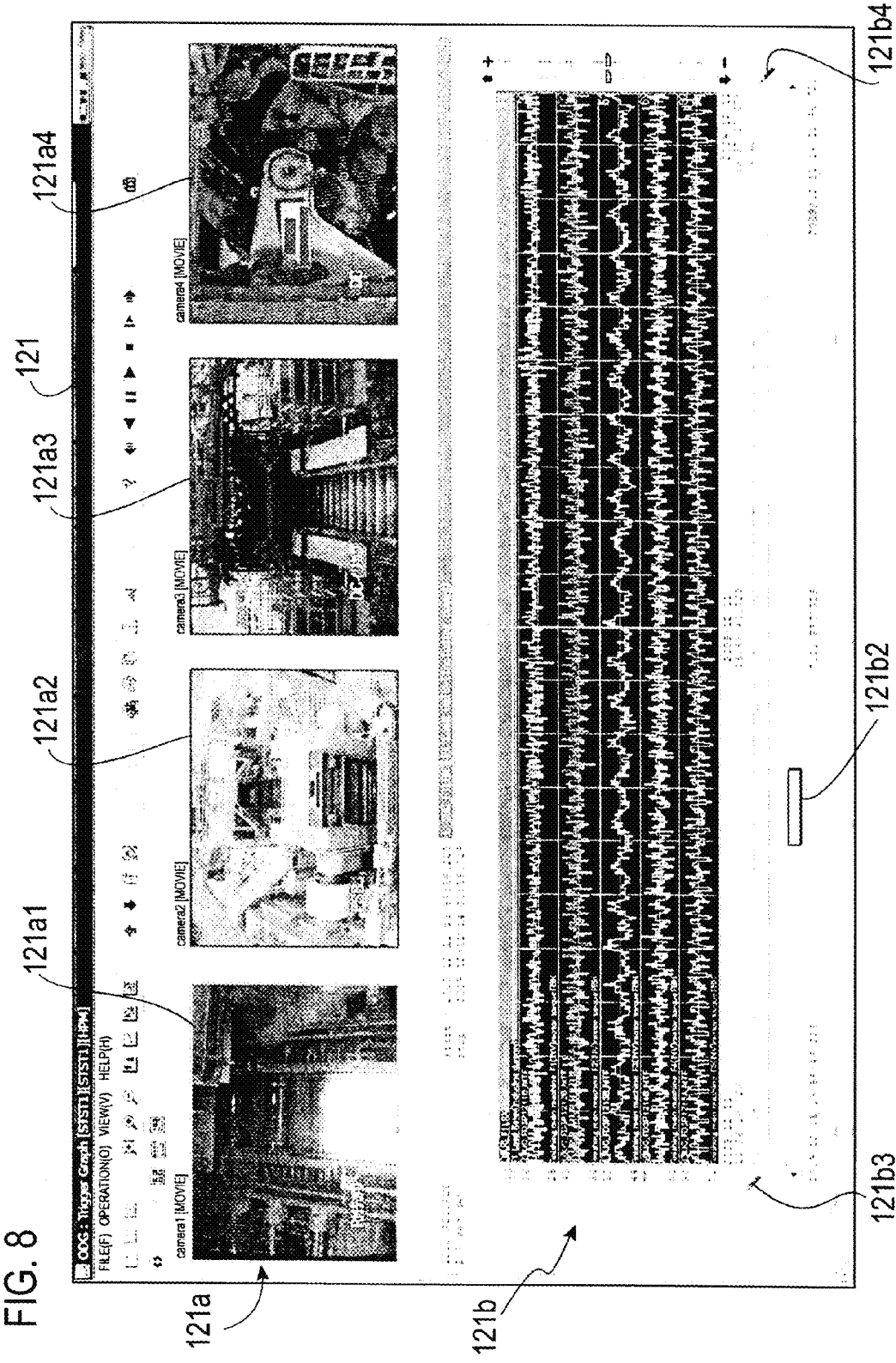
FIG. 8 is a diagram showing an example of a display screen to be displayed on a monitor of the data synchronous reproduction apparatus of Embodiment 1.

In addition, in FIG. 8, reference sign 121*b*3 denotes an extracted recording start position specification bar for specifying a position at which to start an extracted recording (a snapshot) of the process data displayed in the process data display area 121*b*; and reference sign 121*b*4 denotes an extracted recording termination position specification bar for specifying a position at which to terminate the extracted recording of the process data displayed in the process data display area 121*b*. These bars are used for the extracted recording (the snap-shot) in Embodiment 12 to be described later, and are not used in Embodiment 1. The user can move these bars in the process data display area 121*b* by using the mouse 14, the keyboard 13 or the like as described above.

Figure 9:
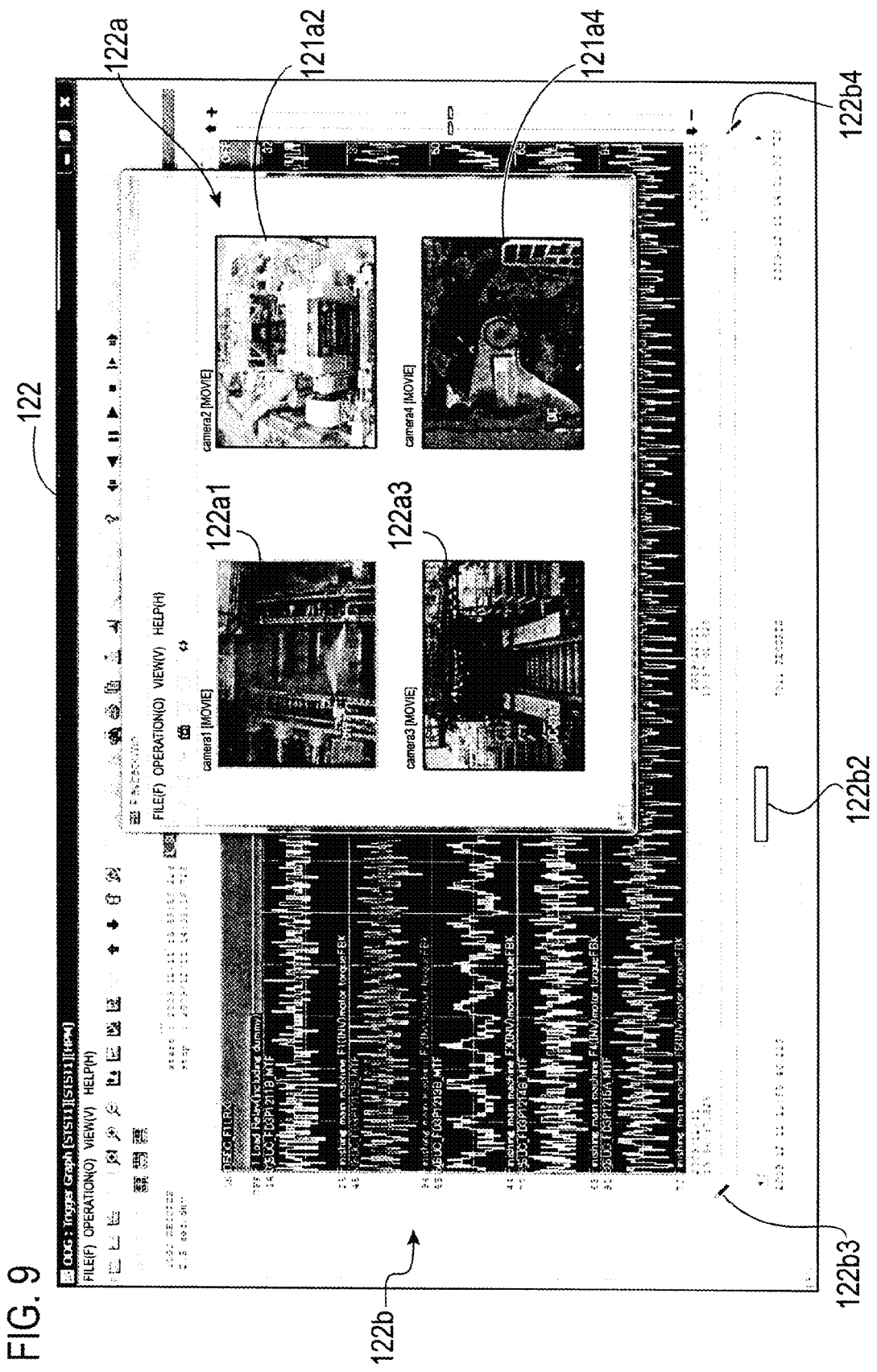
FIG. 9 is a diagram showing another example of a display screen to be displayed on the monitor of the data synchronous reproduction apparatus of Embodiment 1.

In the display screen 122 in FIG. 9 shows a state where the process data display area 122*b* is enlarged over the entire display screen 122 in order to display the process data D2 in an enlarged manner. As a result, the image data display area 121*a* which exists in the upper half above the center of the display screen 121 shown in FIG. 8 cannot be displayed in the display screen 122 shown in FIG. 9. For this reason, the image data display area 122*a* is displayed by being superposed on the process data display area 122*b*, and the data display area 122*a* is provided with the four image data display windows 122*a*1 to 122*a*4.

Figure 10:
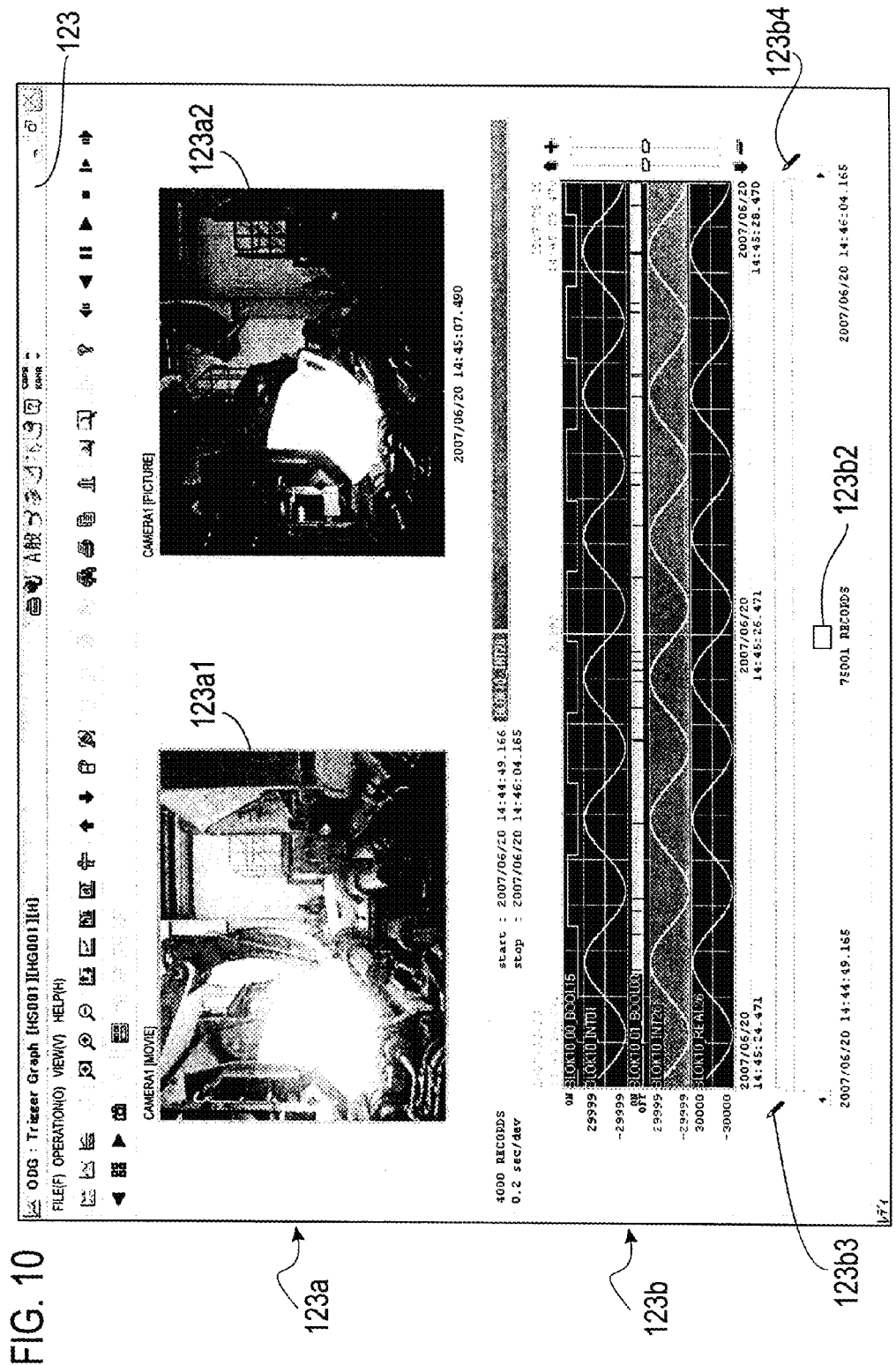
FIG. 10 is a diagram showing another example of a display screen to be displayed on the monitor of the data synchronous reproduction apparatus of Embodiment 1.

Like the display screen 121 shown in FIG. 8, the display screen 123 shown in FIG. 10 is provided with: an image data display area 123*a* placed on an upper side above the center of the display screen 123; and a process data display area 123*b* placed on a lower side below the center of the display screen 123. Furthermore, in the display screen 123, the image data display area 123*a* is provided with two image data display areas 123*a*1, 123*b*2. Image data D1 representing a moving image from the ITV camera 21 with the camera number #1 is displayed in the image data display area 123*a*1, while image data D1 representing a still image from the ITV camera 21 with the same camera number #1 (the camera 1) is displayed in the image data display area 123*a*2. Moreover, in the display screen 123, process data D2 which is synchronized with the image data D1 representing the moving image from the ITV camera 21 with the camera number #1 and displayed in the image data display area 123*a*1, and which is acquired by the corresponding controller from the monitored object captured by the ITV camera 21 with the camera number #1, is displayed in the process data display area 123*b*. It should be noted that the process data display area 123*b* is not different at all from the process data display areas 121*b*, 122*b* in the display screens 121, 122 shown in FIGS. 8 and 9.

Figure 11:
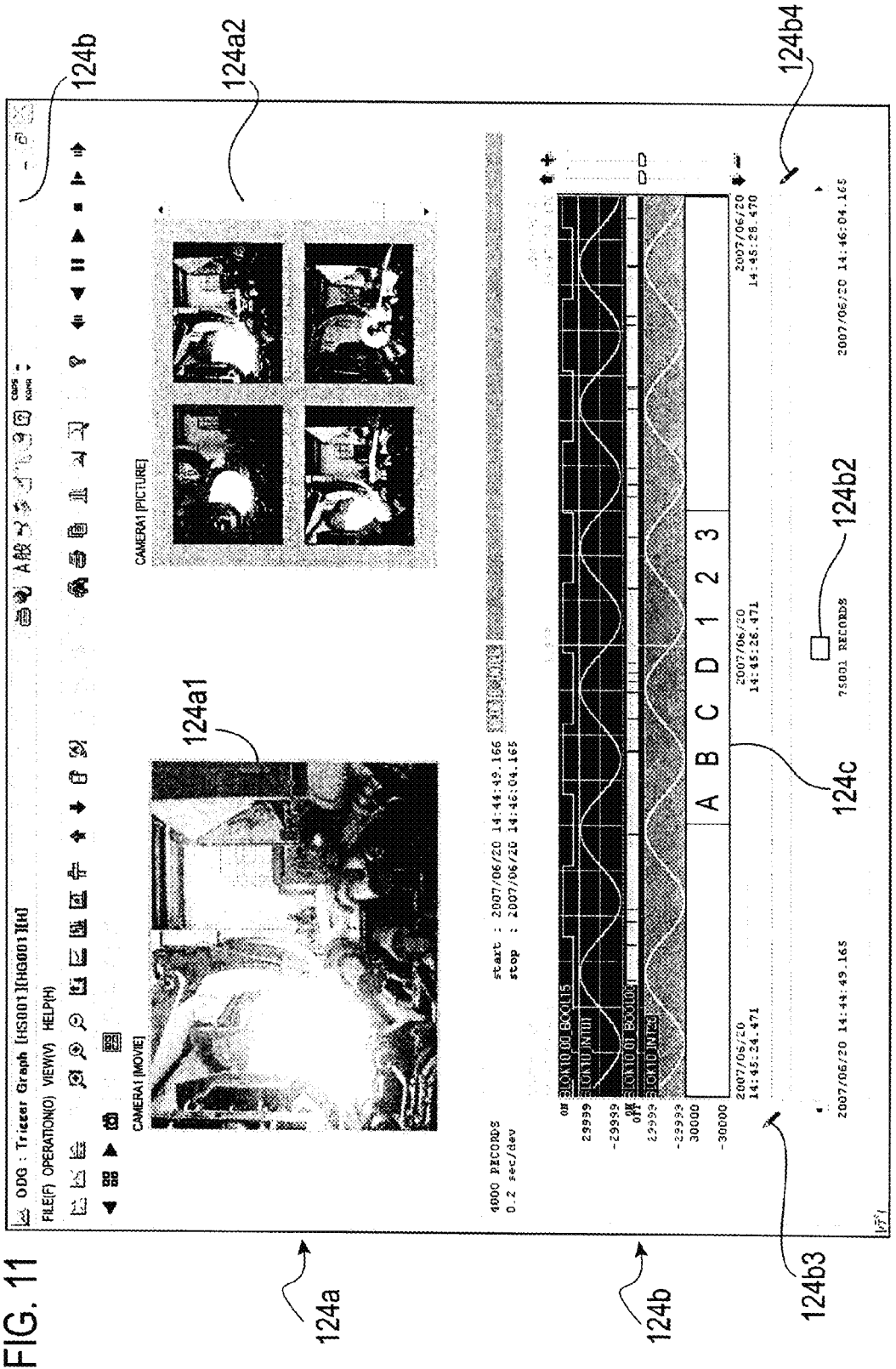
FIG. 11 is a diagram showing another example of a display screen to be displayed on the monitor of the data synchronous reproduction apparatus of Embodiment 1.

Like the display screen 121 shown in FIG. 8 and the like, the display screen 124 shown in FIG. 11 is provided with: an image data display area 124*a* placed on an upper side above the center of the display screen 124; and a process data display area 124*b* placed on a lower side below the center of the display screen 124. In addition, like in the display screen 123 shown in FIG. 10, in the display screen 124, the imaged data display area 124*a* is provided with two image data display areas 124*a*1. The image data D1 representing the moving image from the ITV camera 21 with the camera number #1 is displayed in the image data display area 124*a*1, while image data D1 representing four still images captured by the ITV camera 21 with the same camera number #1 (the camera 1) at different capturing times is displayed in the image data display area 124*a*2.

Furthermore, if the process data D2 includes, for example, text data on the lot number and the like of rolled steel subjected to a rolling process, text data D124c is displayed in the process data display area 124*b*.

It should be noted that the process data display area 124*b* is not different at all from the process data display areas 121*b* to 123*b* in the display screens 121 to 123 shown in FIGS. 8 to 10.

Figure 12:
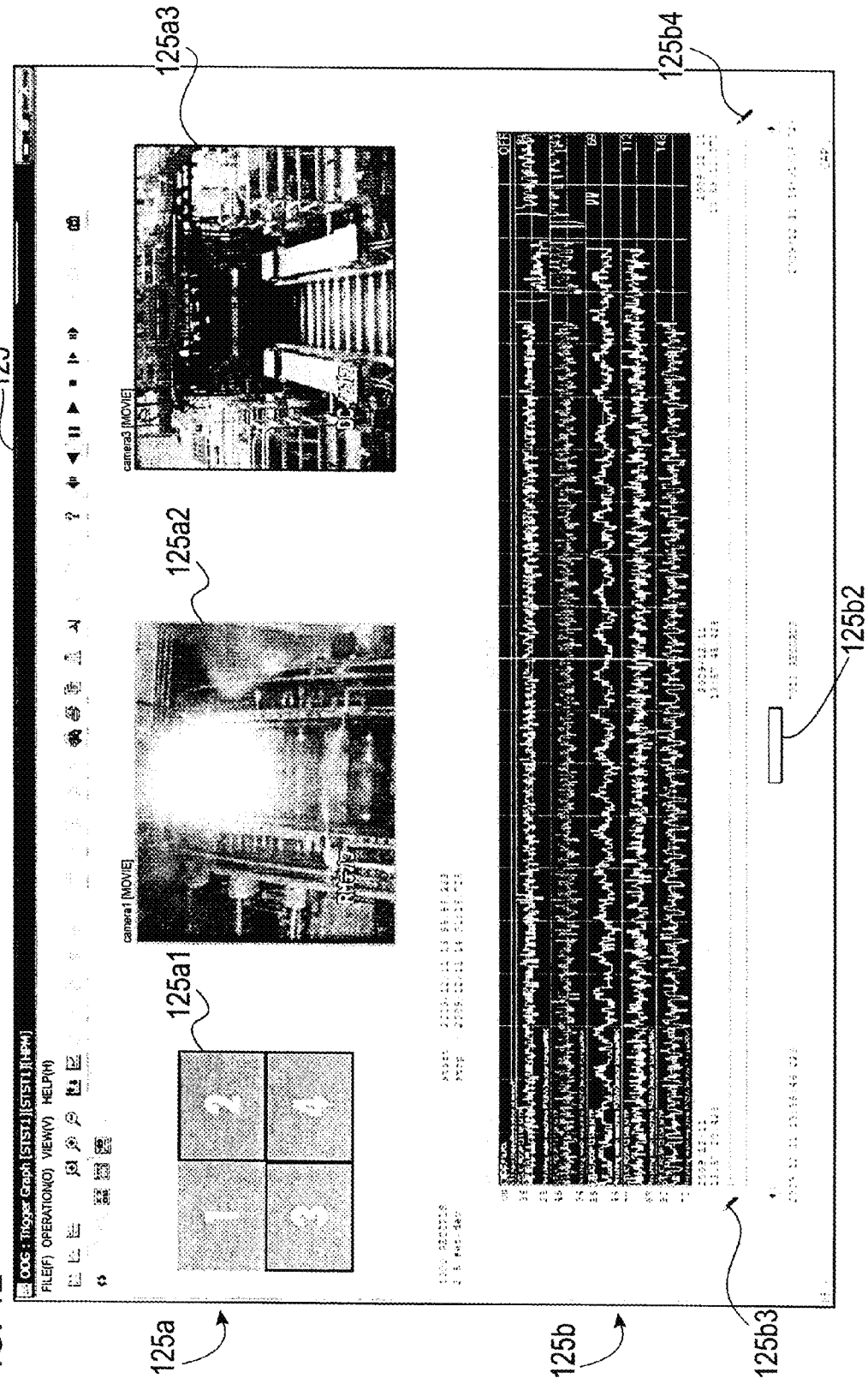
FIG. 12 is a diagram showing another example of a display screen to be displayed on the monitor of the data synchronous reproduction apparatus of Embodiment 1.

Like the display screen 121 shown in FIG. 8 and the like, the display screen 125 shown in FIG. 12 is provided with: an image data display area 125*a* placed on an upper side above the center of the display screen 125; and a process data display area 125*b* placed on a lower side below the center of the display screen 125. Furthermore, in the display screen 125, for example, camera video image specification buttons 125*a*1 for selecting two from four camera video images are displayed in the image data display area 125*a*, while moving image data from two ITV cameras 21, 23 (cameras 1, 3) with the camera numbers #1, #3 which are selected by use of the camera video image specification buttons 125a1 is displayed in image data display areas 125a2, 125a3. Thereby, the windows of the image data display areas 125a2, 125a3 in the display screen 125 become larger in size than the windows of the image data display areas 123a1 to 121a4 in the display screen 121 shown in FIG. 8, although smaller than the windows of the image data display areas 123a1, 123a2 in the display screen 123 shown in FIG. 10. Accordingly, the image data D1 becomes more visible. It should be noted that the process data display area 125b in the display screen 125 is not different at all from the process data display areas 121b to 124b in the display screens 121 to 124 shown in FIGS. 8 to 11.

As described above, the data synchronous reproduction apparatus 1 of Embodiment 1 is capable of synchronously reproducing the image frames D12 and the numerical data D23 by use of: the frame numbers and the frame period Tf of the image frames D12 included in the image data D1; and the elapsed times, the sampling interval Ts2 and the like of the numerical data D23 included in the process data D2, and is capable of displaying display screens, like the display screens 121 to 125 shown in FIGS. 8 to 12, on the monitor 12. As a consequence, the data synchronous reproduction apparatus 1 of Embodiment 1 need not refer to any time information on both of the data when synchronously reproducing the image data D1 and the numerical data D23, and accordingly is capable of: reducing the number of files and the storage capacity for the files; and performing storage and synchronous reproduction covering a longer period of time than that available with the related art by using the storage unit having the same storage capacity as that of the related art.

Moreover, since the numerical data D23 are acquired and stored from the monitored objects 61 to 6p only when there are the temporal changes, the storage capacity for data during the elapsed times D22 can be significantly reduced if there is no temporal change.

Furthermore, since the image frame compressing and decoding technique, such as MPEG-4, can be used to store the images, the generalized image data reproduction program, such as QuickTime (registered trademark) Player, can be used to reproduce the images. Thereby, development costs can be reduced.

What is more, the data and the image frames can be synchronously reproduced and cued at high speed without using the time information.

Embodiment 2

Although Embodiment 1 has described the process for synchronously reproducing the image data D1 and the process data D2 by use of the frame numbers of the image frames D12 and the elapsed times without reference to the time information, the present invention is not limited to the foregoing.

In Embodiment 2, descriptions will be provided for a data synchronous reproduction apparatus of Embodiment 2 which is capable, in addition to the functions of Embodiment 1, of automatically storing image frames D12 synchronized with numerical data D23 corresponding to a specified time period by specifying the time period of the numerical data D23 to be extracted from the process data D2 and to be recorded, i.e., the time period of the numerical data D23 to be subjected to a snap-shot recording.

Accordingly, the data synchronous reproduction apparatus of Embodiment 2 has a snap-shot recording function in addition to the functions of the data synchronous reproduction apparatus 1 of Embodiment 1. To this end, the data synchronous control program stored in the program storage section 113a further includes a program for making the data synchronous reproduction apparatus function as a synchronous save controller which is the snap-shot recording function. It should be noted that the configuration of the data synchronous reproduction apparatus of Embodiment 2 is the same as that of Embodiment 1. Accordingly, descriptions will be provided only for characteristic operations by referring to the configuration shown in FIGS. 1 and 2.

To put it specifically, in the data synchronous reproduction apparatus 1 of Embodiment 2, for example, the user moves the extracted recording start position specification bar 121b3 and the extracted recording termination specification bar 121b4 in the process data display area 121b displayed on the monitor 12 by using the mouse 14, the keyboard 13 or the like as shown in FIG. 8, thereby specifying the time period for the process data D2 to be extracted and separately recorded from the process data D2. Subsequently, once the user clicks a save button (not illustrated) and the like, the CPU 111 executes the data synchronous control program stored in the program storage section 113a. First, the CPU 111 functions as the synchronous image frame selector, and converts the record numbers of the numerical data D23 corresponding to the time period specified by the user into the frame numbers of the image frames D12 within a range synchronized with the numerical data D23 corresponding to the specified time period by use of Equation (2) given above and the like, as in the case of the synchronous reproduction in Embodiment 1. To put it specifically, the CPU 111 calculates the frame numbers of the image frames D21 corresponding to the specified time period on the basis of: relative times of the head and end of the specified time period from the first record; and the frame period of the image frames D12.

Subsequently, the CPU 111 functions as the synchronous save controller by executing the data synchronous control program, associates the numerical data D23 corresponding to the time period specified by the user with the image frames D12 synchronized with the numerical data D23 corresponding to the specified time period, and stores the numerical data D23 and the image frames D12 thus associated into the data storage section 113b, as a data file Df different from the data file Df from the image data D1 and the process data D2, that is to say, in a way that the numerical data D23 corresponding to the time period specified by the user, and the image frames D12 synchronized with the numerical data D23 corresponding to the specified time period are extracted from the data file Df.

For this reason, the data synchronous reproduction apparatus 1 of Embodiment 2 is further capable of sending the file to another computer apparatus via networks such as the Internet and an intranet by attaching the file to an email using a mail program or the like.

Thereby, once receiving the file storing the numerical data D23 corresponding to the time period specified by the user and the image frames D12 synchronized with the numerical data D23 corresponding to the time period, the other computer apparatus is capable of performing a remote diagnosis and the like by synchronously reproducing the numerical data D23 corresponding to the time period specified by the user, and the image frames D12 synchronized with the numerical data D23 corresponding to the specified time period, from the received file if the computer apparatus has the function of synchronously reproducing the image data D1 and the process data D2 like the data synchronous reproduction apparatuses 1 of Embodiments 1 and 2.

REFERENCE SIGNS LIST 1 data synchronous reproduction apparatus
11 apparatus main body 12 monitor
13 keyboard
14 mouse
111 CPU (image data reproducer, data synchronous reproduction controller, synchronous image frame selector, synchronous save controller, screen layout setter)
112 memory
113 storage unit
113a program storage section
113b data storage section (image data storage section, process data storage section)
114 external equipment I/F unit
115 control network I/F unit
116 LAN I/F unit
21 to 2m ITV camera (m: a natural number)
3 camera switcher
4 digital image conversion unit
51 to 5n controller (n: a natural number)
61 to 6p monitored object (p: a natural number)

INDUSTRIAL APPLICABILITY

The present invention is applicable to an online data management system and the like for monitoring a plant.

The invention claimed is:

1. A data synchronous reproduction apparatus comprising:
an image data storage section configured to store a plurality of image frames on which a monitored object is captured by a camera, together with a frame period of the image frames, as image data with frame numbers assigned to the image frames in time series;
a process data storage section configured to store data acquired from the monitored object and including a temporal change, and an elapsed time from a reference time point, collectively as process data;
an image data reproducer configured to output and reproduce the image data, stored in the image data storage section, on a monitor, and to output the frame number of the image frame to be reproduced; and
a data synchronous reproduction controller configured to calculate a relative time, from a first frame, of the image frame corresponding to the frame number outputted from the image data reproducer and to reproduce the image data on the monitor on the basis of the calculated relative time from the first frame.

2. The data synchronous reproduction apparatus according to claim 1, wherein when a certain time point is specified for the process data displayed on the monitor, the data synchronous reproduction controller
calculates a relative time from the reference time point to the specified time point,
calculates the frame number on the basis of the calculated relative time and the frame period of the image frame,
outputs the calculated frame number to the image data reproducer, and
causes the image data reproducer to reproduce the image data having the calculated frame number.

3. The data synchronous reproduction apparatus according to claim 1, further comprising:
a synchronous image frame selector configured to,
when a time period of data to be stored as a different file in the process data displayed on the monitor is specified by an external input,
calculate the frame number of the image frame corresponding to the specified time period on the basis of relative times of a head and an end of the specified time period from the reference time point, and the frame period of the image frame, and
select the image frame corresponding to the calculated frame number; and
a synchronous save controller configured to store the data corresponding to the time period specified by the external input, and the image frame selected by the synchronous image frame selector, collectively as the same file.

4. The data synchronous reproduction apparatus according to claim 1, further comprising a screen layout setter configured to set an image data reproduction area in which the image data is displayed by the image data reproducer, and a process data reproduction area in which the process data is displayed by the data synchronous reproduction controller, on the monitor on the basis of the external input, and to set the number of records and the size of image data to be reproduced in the image data reproduction area within a predetermined condition.

5. A data synchronous reproduction method comprising:
an image data storing step of storing a plurality of image frames on which a monitored object is captured by a camera, together with a frame period of the image frames, in an image data storage section as image data with frame numbers assigned to the respective image frames in time series;
a process data storing step of storing data acquired from the monitored object and including a temporal change, and an elapsed time from a reference time point, in a process data storage section collectively as process data;
an image data reproducing step of outputting and reproducing the image data, stored in the image data storage section, on a monitor, and outputting the frame number of the image frame to be reproduced; and
a data synchronous reproduction controlling step of calculating a relative time, from a first frame, of the image frame corresponding to the frame number outputted in the image data reproducing step, and reproducing the image data on the monitor on the basis of the calculated relative time from the first frame.

6. The data synchronous reproduction method according to claim 5, wherein the data synchronous reproduction controlling step includes: when a certain time point is specified for the process data displayed on the monitor,
calculating a relative time from the reference time point to the specified time point;
calculating the frame number on the basis of the calculated relative time and the frame period of the image frame;
outputting the calculated frame number; and
causing the image data having the calculated frame number to be reproduced in the image data reproducing step.

7. The data synchronous reproduction method according to claim 5, further comprising:
a synchronous image frame selecting step of,
when a time period of data to be stored as a different file in the process data displayed on the monitor is specified by an external input,
calculating the frame number of the image frame corresponding to the specified time period on the basis of relative times of a head and an end of the specified time period from the reference time point, and the frame period of the image frame, and
selecting the image frame corresponding to the calculated frame number; and
a synchronous save controlling step of storing the data corresponding to the time period specified by the external input, and the image frame selected in the synchronous image frame selector, collectively as the same file.

8. The data synchronous reproduction method according to claim 5, further comprising a screen layout setting step of setting an image data reproduction area in which the image data is displayed in the image data reproducing step, and a process data reproduction area in which the process data is displayed in the data synchronous reproduction controlling step on the monitor on the basis of the external input, and setting the number of records and the size of image data to be reproduced in the image data reproduction area within a predetermined condition.

* * * * *